United States Patent
Uchino et al.

(10) Patent No.: US 9,788,191 B2
(45) Date of Patent: Oct. 10, 2017

(54) MOBILE STATION AND RADIO BASE STATION

(71) Applicant: NTT DOCOMO, INC., Tokyo (JP)

(72) Inventors: Tooru Uchino, Tokyo (JP); Yuta Sagae, Tokyo (JP)

(73) Assignee: NTT DOCOMO, INC, Tokyo (JP)

( * ) Notice: Subject to any disclaimer, the term of this patent is extended or adjusted under 35 U.S.C. 154(b) by 0 days.

(21) Appl. No.: 14/654,871

(22) PCT Filed: Dec. 5, 2013

(86) PCT No.: PCT/JP2013/082660
§ 371 (c)(1),
(2) Date: Jun. 23, 2015

(87) PCT Pub. No.: WO2014/103648
PCT Pub. Date: Jul. 3, 2014

(65) Prior Publication Data
US 2015/0350882 A1    Dec. 3, 2015

(30) Foreign Application Priority Data
Dec. 28, 2012    (JP) ................................ 2012-287437

(51) Int. Cl.
*H04W 8/20* (2009.01)
*H04W 72/04* (2009.01)
(Continued)

(52) U.S. Cl.
CPC ............. *H04W 8/205* (2013.01); *H04L 5/001* (2013.01); *H04L 5/0094* (2013.01); *H04W 8/24* (2013.01);
(Continued)

(58) Field of Classification Search
CPC ............................ H04L 5/001; H04W 76/025; H04W 72/0413; H04W 24/10; H04W 92/20
See application file for complete search history.

(56) References Cited

U.S. PATENT DOCUMENTS 8,913,518 B2 * 12/2014 Heo ...................... H04W 52/02
  370/252
2010/0267394 A1 * 10/2010 Wu ........................ H04W 24/10
  455/450
(Continued)

FOREIGN PATENT DOCUMENTS

EP          2523512 A1    11/2012
WO     2010/029822 A1    3/2010
(Continued)

OTHER PUBLICATIONS

European Search Report issued in corresponding European Application No. 13869447.6, dated Nov. 11, 2016 (9 pages).
(Continued)

*Primary Examiner* — Jung Park
(74) *Attorney, Agent, or Firm* — Osha Liang LLP

(57) ABSTRACT

"Inter-site CA" using CCs under different radio base stations eNB in an asynchronous state can be performed appropriately. A mobile station UE of the present invention comprises a transmission unit 12 configured to transmit "UE Capability Information" to a radio base station eNB, the "UE Capability Information" indicating whether the mobile station UE is capable of performing "Inter-site CA" using CCs under different radio base stations eNB in the asynchronous state.

1 Claim, 5 Drawing Sheets

(51) Int. Cl.
  *H04W 56/00* (2009.01)
  *H04W 8/24* (2009.01)
  *H04L 5/00* (2006.01)

(52) U.S. Cl.
  CPC ......... *H04W 56/00* (2013.01); *H04W 56/002* (2013.01); *H04W 56/003* (2013.01); *H04W 72/0413* (2013.01)

(56) References Cited

U.S. PATENT DOCUMENTS

| | | | |
|---|---|---|---|
| 2012/0087257 A1 | 4/2012 | Larsson et al. | |
| 2014/0029558 A1* | 1/2014 | Frederiksen | H04L 5/001 370/329 |
| 2014/0050113 A1* | 2/2014 | Rosa | H04W 52/0229 370/252 |
| 2014/0126556 A1* | 5/2014 | Tiirola | H04L 47/827 370/336 |
| 2014/0140318 A1 | 5/2014 | Uemura et al. | |
| 2014/0177555 A1* | 6/2014 | Ng | H04W 72/0406 370/329 |
| 2015/0003348 A1* | 1/2015 | Ishii | H04L 27/2601 370/329 |
| 2015/0055621 A1* | 2/2015 | Koskinen | H04W 36/18 370/331 |
| 2015/0131569 A1* | 5/2015 | Rosa | H04W 72/042 370/329 |
| 2015/0223235 A1* | 8/2015 | Hwang | H04B 7/02 370/329 |
| 2015/0230098 A1* | 8/2015 | Li | H04W 16/10 455/454 |
| 2015/0230236 A1* | 8/2015 | Zeng | H04L 41/0806 370/329 |
| 2015/0257065 A1* | 9/2015 | Frederiksen | H04W 52/0206 370/331 |

FOREIGN PATENT DOCUMENTS

| | | |
|---|---|---|
| WO | 2012/017087 A1 | 2/2012 |
| WO | 2012/176703 A1 | 12/2012 |

OTHER PUBLICATIONS

International Search Report issued in PCT/JP2013/082660 dated Mar. 11, 2014 (3 pages).
Written Opinion of the International Searching Authority issued in PCT/JP2013/082660 dated Mar. 11, 2014 (4 pages).
ST-Ericsson/Ericsson; "Discussion on UE performance requirements for non contiguous carrier aggregation"; 3GPP TSG-RAN WG4 Meeting #64bis, R4-125421; Santa Rosa, California, USA; Oct. 8-12, 2012 (6 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2012 (205 pages).
Partial Supplementary European Search Report dated Aug. 10, 2016, in corresponding European Patent Application No. 13869447.6 (6 pages).
Office Action issued in the counterpart Japanese Patent Application No. 2016-047453, dated Jun. 6, 2017 (6 pages).

* cited by examiner

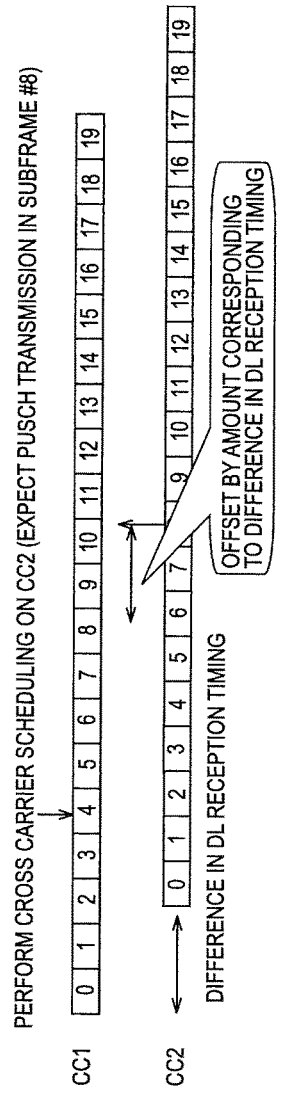

MOBILE STATION AND RADIO BASE STATION

TECHNICAL FIELD

The present invention relates to a mobile station and a radio base station.

BACKGROUND ART

In release-10 of LTE (Long Term Evolution), "Intra-eNB CA (Carrier Aggregation)" in which multiple CCs (Component Carriers) under the same radio base station eNB are aggregated to perform communication as shown in part (a) of FIG. 5 has been introduced to achieve communication in a wide bandwidth exceeding 20 MHz (for example, communication of 100 MHz).

Later, Release-12 and beyond of LTE have proposed "Small Cell Enhancement", and "Inter-site CA" in which communication is performed by aggregating CCs (cells) under different radio base stations eNB has been considered to be introduced as one of network architectures which are more flexible than conventional architectures (see part (b) of FIG. 5).

For example, the following operation is conceivable by using the "Inter-site CA". As shown in part (b) of FIG. 5, a C-plain signal for which reliability needs to be secured is communicated through a SRB (Signaling Radio Bearer) in a cell #1 (macro cell) under a radio base station eNB#1 (macro eNB), and a U-plane signal which requires broadband communication is communicated through a DRB (Data Radio Bearer) in a cell #10 (small cell) under a radio base station eNB#10 (small radio base station).

PRIOR ART DOCUMENT

Non-Patent Document

Non-patent document 1: 3GPP 36.300

SUMMARY OF THE INVENTION

FIG. 6 shows a frame configuration in an existing LTE method. In this method, not all of the radio base stations eNB are necessarily in a synchronous state (in units of radio frames, in units of subframes, or the like).

Accordingly, in a case of performing "Inter-site CA" using CCs under different radio base stations eNB in an asynchronous state, a mobile station UE needs to correct a difference in timing between the radio base stations eNB.

For example, FIG. 7 shows a case where "Cross Carrier Scheduling" is performed by transmitting a signal to a mobile station UE in CC1, the signal indicating such allocation that the mobile station UE will transmit a PUSCH (Physical Uplink Shared Channel) signal in a subframe #8 of CC2. In such a case, the mobile station UE needs to correct a difference in reception timing in downlink between CC1 and CC2.

In this case, whether such correction can be performed depends on the capability of the mobile station UE.

However, the existing LTE method does not specify a mechanism for the mobile station UE to send the radio base station eNB capability information indicating whether the mobile station UE is capable of performing the aforementioned correction.

Accordingly, there is a possibility that the radio base station eNB instructs the mobile station UE, incapable of performing the aforementioned correction, to perform the "Inter-site CA" using CCs under different radio base stations eNB in the asynchronous state.

The present invention has been made in view of the problems described above, and an object is to provide a mobile station and a radio base station which can appropriately perform the "Inter-site CA" using CCs under different radio base stations eNB in the asynchronous state.

A first feature of the present invention is summarized as a mobile station including a transmission unit configured to transmit capability information to a radio base station, the capability information indicating whether the mobile station is capable of performing carrier aggregation using component carriers under different radio base stations in an asynchronous state.

A second feature of the present invention is summarized as a radio base station including: a reception unit configured to receive capability information from a mobile station, the capability information indicating whether the mobile station is capable of performing carrier aggregation using component carriers under different radio base stations in an asynchronous state; and a control unit configured determine whether to cause the mobile station to perform the carrier aggregation based on the capability information.

A third feature of the present invention is summarized as a radio base station configured to exchange notifications of a unit time applicable to establish synchronization, with another base station.

BRIEF DESCRIPTION OF THE DRAWINGS

FIG. 7 is a view for explaining a conventional art.

DETAILED DESCRIPTION (Mobile Communication System in First Embodiment of Present Invention)

A mobile communication system in a first embodiment of the present invention is described with reference to FIGS. 1 to 4.

Figure 1:
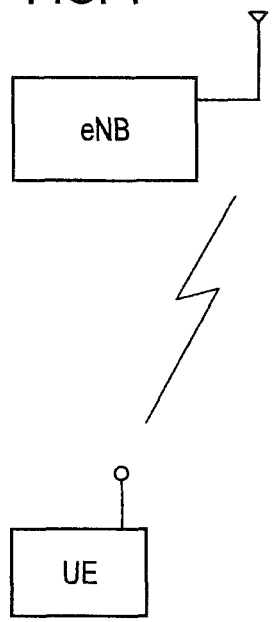
FIG. 1 is an overall configuration diagram of a mobile communication system in a first embodiment of the present invention.

As shown in FIG. 1, the mobile communication system in the embodiment is a mobile communication system of LTE Release-12 or beyond and is configured such that "Inter-site CA" using CCs under different radio base stations eNB in an asynchronous state can be applied.

Note that the mobile communication system of the embodiment is configured such that not all of the radio base stations eNB are in a synchronous state.

Figure 2:
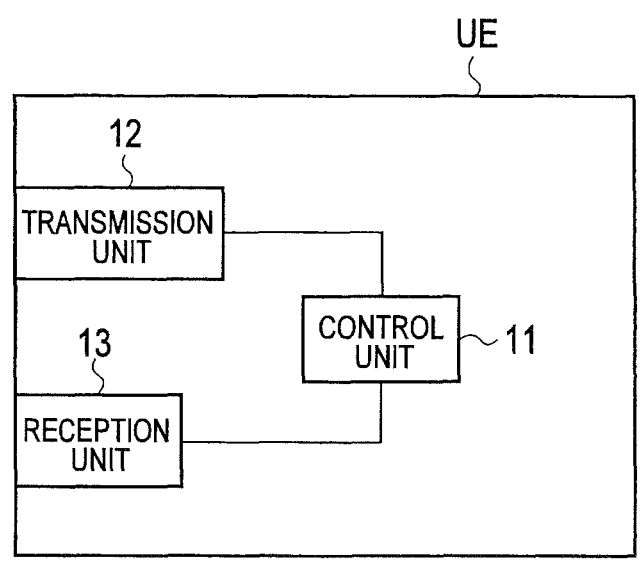
FIG. 2 is a functional block diagram of a mobile station UE in the first embodiment of the present invention.

As shown in FIG. 2, a mobile station UE of the embodiment includes a control unit 11, a transmission unit 12, and a reception unit 13.

The control unit 11 is configured to perform various controls in the mobile station UE such as a control required to perform the "Inter-site CA", for example.

The transmission unit 12 is configured to transmit various signals to the radio base stations eNB, and the reception unit 13 is configured to receive various signals from the radio base stations eNB.

For example, the transmission unit 12 is configured to transmit "UE Capability Information" to a radio base station eNB when the reception unit 13 receives a "UE Capability Enquiry" from the radio base stations eNB.

In this case, the transmission unit 12 notifies the radio base station eNB whether the control unit 11 can perform the "Inter-site CA" using CCs under different radio base stations eNB in the asynchronous state, by using this "UE capability Information".

Note that the transmission unit 12 may be configured to perform such notification by using a signal other than the "UE capability Information".

Moreover, the transmission unit 12 may be configured to notify the radio base station eNB of the number of the radio base stations eNB which the mobile station UE can use in the "Inter-site CA".

The transmission unit 12 may be configured to perform such notification by using the "UE capability Information" or by using a signal other than the "UE capability Information".

Furthermore, the transmission unit 12 may be configured to notify the radio base station eNB of the number of CCs which the mobile station UE can use in the "Inter-site CA".

The transmission unit 12 may be configured to perform such notification by using the "UE Capability Information" or by using a signal other than the "UE capability Information".

The transmission unit 12 may be configured to notify the radio base station eNB whether the mobile station UE can perform the "Inter-site CA" using CCs under different radio base stations eNB in the asynchronous state, per unit time.

For example, the transmission unit 12 may be configured as follows. When the mobile station UE can perform the "Inter-site CA" using CCs under different radio base stations eNB in the asynchronous state in units of subframes, the transmission unit 12 notifies the radio base station eNB that the mobile station UE can perform the "Inter-site CA" using CCs under different radio base stations eNB in the asynchronous state in units of subframes.

Moreover, the transmission unit 12 may be configured as follows. When the mobile station UE can perform the "Inter-site CA" using CCs under different radio base stations eNB in the asynchronous state in units of radio frames, the transmission unit 12 notifies the radio base station eNB that the mobile station UE can perform the "Inter-site CA" using CCs under different radio base stations eNB in the asynchronous state in units of radio frames.

Note that the transmission unit 12 may be configured to notify the radio base station eNB that the mobile station UE can perform the "Inter-site CA" using CCs under different radio base stations eNB in the asynchronous state in units of subframes but cannot perform the "Inter-site CA" using CCs under different radio base stations eNB in the asynchronous state in units of radio frames.

The transmission unit 12 may be configured to perform such notification by using the "UE capability Information" or by using a signal other than the "UE capability Information".

Moreover, the transmission unit 12 may be configured to transmit the aforementioned "UE Capability Information" for every frequency band, to transmit the aforementioned "UE Capability Information" for every communication functional block, or to transmit the aforementioned "UE Capability Information" for every "CA band combination".

Figure 3:
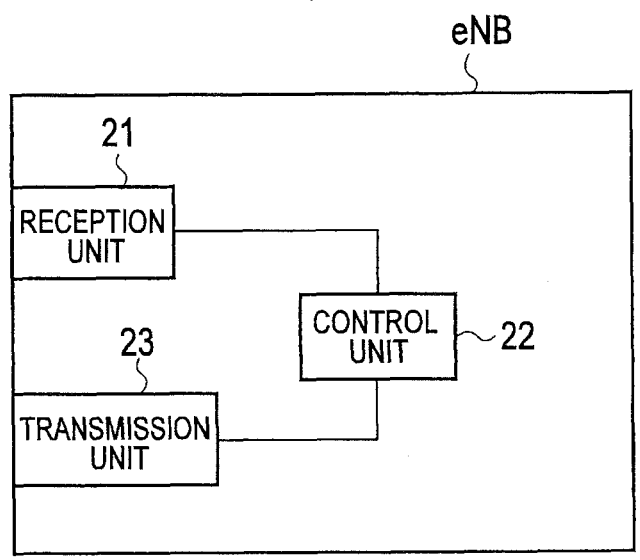
FIG. 3 is a functional block diagram of a radio base station eNB in the first embodiment of the present invention.

As shown in FIG. 3, each of the radio base stations eNB in the embodiment includes a reception unit 21, a control unit 22, and a transmission unit 23.

The reception unit 21 is configured to receive various signals from the mobile station UE. The control unit 22 is configured to perform various controls in the radio base station eNB such as a control for performing the "Inter-site CA", for example. The transmission unit 23 is configured to transmit various signals to the mobile station UE.

For example, the control unit 22 is configured as follows. When the reception unit 21 receives the aforementioned "UE Capability Information" from the mobile station UE, the control unit 22 determines whether cause the mobile station UE to perform the "Inter-site CA" using CCs under different radio base stations eNB in the asynchronous state based on the received "UE Capability Information".

Moreover, the transmission unit 23 is configured to transmit the aforementioned "UE Capability Enquiry" to the mobile station UE.

Figure 4:
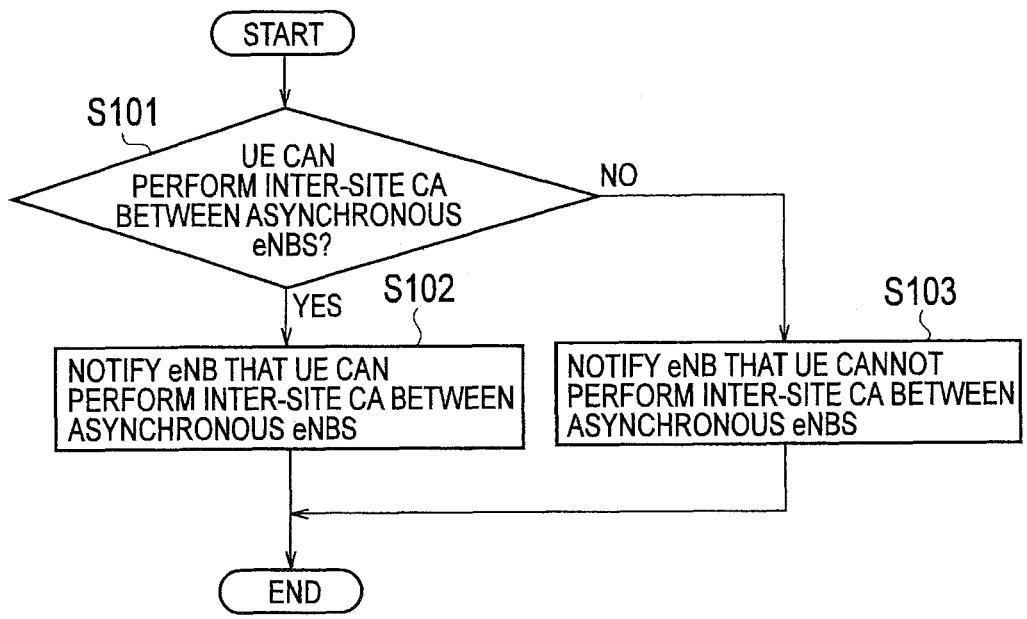
FIG. 4 is a flowchart showing an operation of the mobile station UE in the first embodiment of the present invention.
Figure 5:
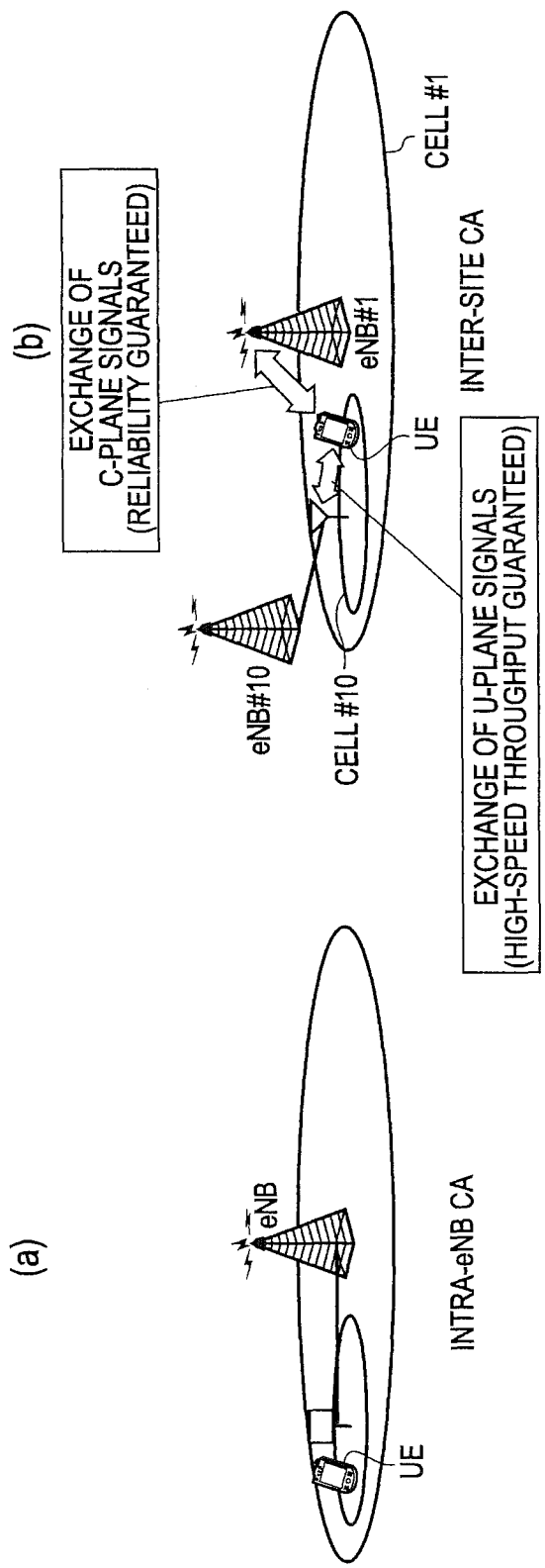
FIG. 5 is a view for explaining a conventional art.
Figure 6:
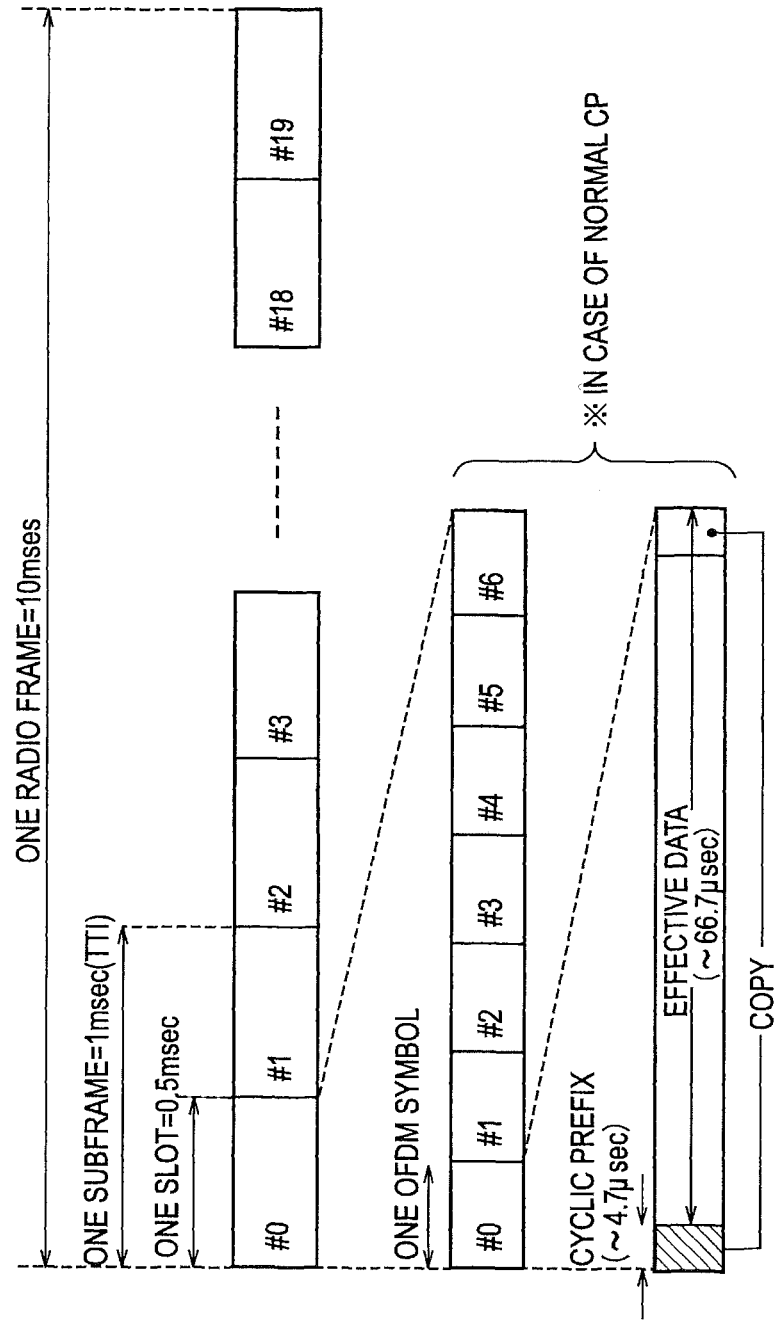
FIG. 6 is a view for explaining a conventional art.

An operation of the mobile communication system of the embodiment, specifically, the mobile station UE of the embodiment is described with reference to FIG. 4.

The mobile station UE determines whether it can perform the "Inter-site CA" using CCs under different radio base stations eNB in the asynchronous state.

If "YES", the operation proceeds to step S102. If "NO", the operation proceeds to step S103.

In step S102, the mobile station UE notifies the radio base station eNB that the mobile station UE can perform the "Inter-site CA" using CCs under different radio base stations eNB in the asynchronous state.

Meanwhile, in step S103, the mobile station UE notifies the radio base station eNB that the mobile station UE cannot perform the "Inter-site CA" using CCs under different radio base stations eNB in the asynchronous state.

Modified Example 1

The mobile communication system in a modified example 1 of the present invention may be configured such that the radio base stations eNB notify each other of a time unit (for example, a radio frame unit or a subframe unit) applicable to establish synchronization via an X2/S1 interface.

The features of the present embodiment may also be expressed as follows.

A first feature of the present embodiment is summarized as a mobile station UE including a transmission unit 12 configured to transmit "UE Capability Information (capability information)" to a radio base station eNB, the "UE Capability Information" indicating whether the mobile station UE is capable of performing "Inter-site CA (carrier aggregation)" using CCs (component carriers) under different radio base stations eNB in an asynchronous state.

Such a configuration can avoid a situation where the radio base station eNB instructs the mobile station UE, incapable of performing the "Inter-site CA" using CCs under different radio base stations eNB in the asynchronous state, to perform such "Inter-site CA".

In the first feature of the embodiment, the transmission unit 12 may notify the radio base station eNB of the number of radio base stations eNB usable in the "Inter-site CA".

Such a configuration can avoid a situation where the radio base station eNB instructs the mobile station UE to perform the "Inter-site CA" in such a way that the number of connected radio base stations eNB exceeds the number of radio base stations eNB to which the mobile station UE can simultaneously connect.

In the first feature of the embodiment, the transmission unit 12 may notify the radio base station eNB of the number of CCs usable in the "Inter-site CA".

Such a configuration can avoid a situation where the radio base station eNB instructs the mobile station UE to perform the "Inter-site CA" in such a way that the number of connected CCs exceeds the number of CCs to which the mobile station UE can simultaneously connect.

In the first feature of the embodiment, the transmission unit 12 may transmit the "UE Capability Information" per unit time.

In such a configuration, the radio base station eNB can distinguish the mobile station UE which can perform the "Inter-site CA" using CCs under different radio base stations eNB in the asynchronous state in units of subframes and the mobile station UE which can perform the "Inter-site CA" using CCs under different radio base stations eNB in the asynchronous state in units of radio frames from each other, and perform controls for the "Inter-site CA" distinctively for each of the mobile stations UE.

In the first feature of the embodiment, the transmission unit 12 may transmit the "UE Capability Information" described above for every frequency band.

In such a configuration, there is no need to transmit multiple pieces of "UE Capability Information" in the same frequency band, and the radio resources can be effectively used.

In the first feature of the embodiment, the transmission unit 12 may transmit the "UE Capability Information" described above for every communication functional block.

In such a configuration, there is no need to transmit multiple pieces of "UE Capability Information" in the same communication functional block, and the radio resources can be effectively used.

In the first feature of the embodiment, the transmission unit 12 may transmit the "UE Capability Information" described above for every "CA band combination (carrier aggregation band combination)".

In such a configuration, there is no need to transmit multiple pieces of "UE Capability Information" in the same "CA band combination", and the radio resources can be effectively used.

A second feature of the present embodiment is summarized as a radio base station eNB including: a reception unit 21 configured to receive "UE Capability Information" from a mobile station UE, the "UE Capability Information" indicating whether the mobile station UE is capable of performing "Inter-site CA"; and a control unit 22 configured determine whether to cause the mobile station UE to perform the "Inter-site CA" based on the "UE Capability Information".

A third feature of the present embodiment is summarized as a radio base station eNB configured to exchange notifications of a unit time applicable to establish synchronization, with another base station eNB.

Furthermore, the radio base station eNB may be configured such that the notification of the time unit is performed similarly for controls other than the "Inter-site CA" (for example, coordinated multi-point (CoMP) transmission and reception).

It should be noted that the foregoing operations of the mobile stations UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE and the radio base station eNB. Otherwise, the storage medium and the processor may be provided as discrete components inside the mobile stations UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-287437 (filed on Dec. 28, 2012) is incorporated by reference in the present specification.

INDUSTRIAL APPLICABILITY

As described above, the present invention can provide a mobile station and a radio base station which can appropriately perform "Inter-site CA" using CCs under different radio base stations eNB in the asynchronous state.

EXPLANATION OF THE REFERENCE NUMERALS eNB radio base station
UE mobile station
11, 22 control unit
12, 23 transmission unit
13, 21 reception unit

The invention claimed is:
1. A mobile station that includes a processor coupled to a memory, the mobile station comprising:
a transmitter that transmits capability information by UE Capability Information to a radio base station in response to a capability enquiry by UE Capability Enquiry from the radio base station received by a receiver of the mobile station, wherein
the capability information includes a field that indicates whether the mobile station is capable of communication using component carriers in an asynchronous state under different radio base stations,
the capability information indicates whether the mobile station is capable to cope with a predetermined difference in timing between component carriers under different radio base stations, the transmitter notifies the radio base station of a number of component carriers usable in the communication, and the capability information is associated with a band combination.

\* \* \* \* \*